(12) United States Patent
Oh

(10) Patent No.: US 12,238,148 B2
(45) Date of Patent: Feb. 25, 2025

(54) TERMINAL, WIRELESS COMMUNICATION SYSTEM INCLUDING TERMINAL, AND METHOD OF OPERATING TERMINAL

(71) Applicant: SAMSUNG ELECTRONICS CO., LTD., Suwon-si (KR)

(72) Inventor: Jae Sik Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 17/643,945

(22) Filed: Dec. 13, 2021

(65) Prior Publication Data

US 2022/0201575 A1 Jun. 23, 2022

(30) Foreign Application Priority Data

Dec. 22, 2020 (KR) .................. 10-2020-0181186
Apr. 15, 2021 (KR) .................. 10-2021-0049150

(51) Int. Cl.
*H04L 65/1104* (2022.01)
*H04L 65/1016* (2022.01)
*H04W 60/04* (2009.01)
*H04W 84/04* (2009.01)

(52) U.S. Cl.
CPC ...... *H04L 65/1104* (2022.05); *H04L 65/1016* (2013.01); *H04W 60/04* (2013.01); *H04W 84/042* (2013.01)

(58) Field of Classification Search
CPC ... H04W 36/08; H04W 60/04; H04W 84/042; H04W 36/14; H04W 36/305; H04W 36/0022; H04W 36/0027; H04W 36/0066; H04W 48/16; H04W 48/20; H04L 65/1016; H04L 65/1104; H04L 65/1069; H04L 65/65; H04L 65/1066

See application file for complete search history.

(56) References Cited

U.S. PATENT DOCUMENTS

| 10,178,585 B2 | 1/2019 | Huang-Fu et al. |
| 10,477,438 B2 | 11/2019 | Huang-Fu et al. |
| 2015/0119036 A1* | 4/2015 | Yang ................ H04W 36/0094 455/436 |
| 2017/0289860 A1 | 10/2017 | Wang |

(Continued)

OTHER PUBLICATIONS

Extended European Search Report dated May 10, 2022 in corresponding European Patent Application No. 21214458.8 (17 pages).

(Continued)

*Primary Examiner* — Steven Hieu D Nguyen
(74) *Attorney, Agent, or Firm* — F. CHAU & ASSOCIATES, LLC

(57) ABSTRACT

The present disclosure provides a method of operating a terminal. The method includes connecting a first radio access technology (RAT)-based network to a first base station, transmitting a first message based on a session initiation protocol to the first base station, starting an evolved packet system fallback (ETSFB) timer in response to the first message to the first base station, performing any one of an EPSFB procedure and a transition procedure to connect a second RAT-based network to a second base station by using the EPSFB timer, and performing a voice communication session through the second RAT-based network.

17 Claims, 13 Drawing Sheets

(56) References Cited

U.S. PATENT DOCUMENTS

| | | | |
|---|---|---|---|
| 2019/0132782 A1 | 5/2019 | Kim et al. | |
| 2019/0281506 A1* | 9/2019 | Chiang | H04W 76/19 |
| 2019/0373515 A1 | 12/2019 | Balasubramanian et al. | |
| 2020/0015128 A1 | 1/2020 | Stojanovski et al. | |
| 2020/0112887 A1* | 4/2020 | Kwok | H04W 36/30 |
| 2020/0112892 A1 | 4/2020 | Shi et al. | |
| 2020/0245195 A1 | 7/2020 | Zhu et al. | |
| 2021/0021646 A1* | 1/2021 | Chiang | H04W 28/0236 |
| 2021/0045020 A1* | 2/2021 | Youtz | H04W 76/10 |
| 2021/0051530 A1* | 2/2021 | Venkataraman | H04W 88/06 |
| 2021/0345185 A1* | 11/2021 | Kodali | H04W 36/0072 |

OTHER PUBLICATIONS

3rd Generation Partnership Project; Technical Specification Group Services and System Aspects; Procedures for the 5G System (5GS); Stage 2 (Release 16), 3GPP TS 23.502 V 16.7.0 (Dec. 2020); 603 pages.

MediaTek Inc., "Discussion paper on what UE should do if the EPS-FB or RAT fallback indication is delayed or not received from network when the call is initiated on NR", 3GPP TSG CT WG1 Meeting #130-e, Electronic meeting, May 20-28, 2021, 4 pages.

* cited by examiner

TERMINAL, WIRELESS COMMUNICATION SYSTEM INCLUDING TERMINAL, AND METHOD OF OPERATING TERMINAL

CROSS-REFERENCE TO RELATED APPLICATIONS

This application is based on and claims priority under 35 U.S.C. § 119 to Korean Patent Application No. 10-2020-0181186, filed on Dec. 22, 2020, and Korean Patent Application No. 10-2021-0049150, filed on Apr. 15, 2021 in the Korean Intellectual Property Office, the disclosures of which are incorporated by reference herein in their entirety.

BACKGROUND

The inventive concept relates to a terminal that performs Internet protocol multimedia subsystem (IMS)-based voice communication, a wireless communication system including the terminal, and a method of operating the terminal.

Wireless communication networks provide the ability for users, or devices, to transfer data between devices such as mobile phones, computers, and the like. Fifth-generation (5G) wireless communication systems provide high-speed data service compared to previous generations. The development of a voice communication service of the 5G system is a key element in an evolving wireless network because the 5G system may take advantage of new wireless access. Additionally, the 5G system may take advantage of long-term evolution (LTE) voice architecture and an IMS for a voice communication service.

Additionally, when a fourth-generation (4G) system is converted into a 5G system, the 5G system may not support full network coverage. Therefore, evolved packet system fallback (EPSFB) technology may provide a smooth voice communication service in networks by being closely connected to 4G voice over LTE (VoLTE) deployment. EPSFB is an intermediate step to support a voice communication service in the 5G system.

A terminal may receive certain messages or commands from a base station in the 5G system to perform a handover procedure or a redirection procedure conforming to EPSFB. In some examples, a message or command may not be received by a terminal due to a network connection problem, a weak electric field, etc., and the terminal may not successfully perform the handover procedure or the redirection procedure. Therefore, there is a need in the art for an improved transition procedure between a 5G system and an LTE system.

SUMMARY

The inventive concept provides a system and terminal that provides a user with smooth voice communication. One or more aspects of the techniques described herein include a terminal performing a handover procedure or a redirection procedure conforming to evolved packet system fallback (EPSFB), even when the terminal does not receive a certain message or command from a base station.

According to an example embodiment, a method of operating a terminal includes establishing a first radio access technology (RAT)-based network connection to a first base station, transmitting a first message to the first base station based on a session initiation protocol, starting an EPSFB timer in response to the first message to the first base station, performing an EPSFB procedure or a transition procedure to connect a second RAT-based network to a second base station based on the EPSFB timer, and performing a voice communication session through the second RAT-based network based at least in part on the EPSFB procedure or the transition procedure.

According to another example embodiment, a terminal includes a plurality of antennas, a radio frequency (RF) integrated circuit for a first RAT-based network and a second RAT-based network, and a processor connected to the RF integrated circuit and configured to perform at least one of voice communication and data communication, wherein the processor is further configured to camp on a first base station of the first RAT-based network and performs an Internet protocol multimedia subsystem (IMS) session initiation protocol (SIP) procedure provided by the first RAT-based network to perform the voice communication based on an IMS, and perform an EPSFB procedure or a transition procedure to connect the second RAT-based network to a second base station based on an EPSFB timer during the IMS SIP procedure.

According to another example embodiment, a wireless communication system includes a first base station configured to support a first RAT-based network; a second base station configured to support a second RAT-based network; and a terminal configured to camp on the first base station to perform an IMS SIP procedure provided by a first RAT-based network to perform voice communication based on an IMS, and perform an EPSFB procedure or a transition procedure to connect the second RAT-based network to the second base station by using an EPSFB timer during the IMS SIP procedure.

According to another example embodiment, a method of wireless communication includes establishing a connection with a first base station using a first RAT, starting an EPSFB timer based on initiating a voice communication session with the first base station; and performing the voice communication session through a second base station using a second RAT based at least in part on performing one of: an EPSFB procedure when an EPSFB initiation message has been received prior to expiration of the EPSFB timer or a transition procedure when the EPSFB timer expires prior to receiving the EPSFM initiation message.

BRIEF DESCRIPTION OF THE DRAWINGS

Embodiments of the inventive concept will be more clearly understood from the following detailed description taken in conjunction with the accompanying drawings in which.

Figure 8:
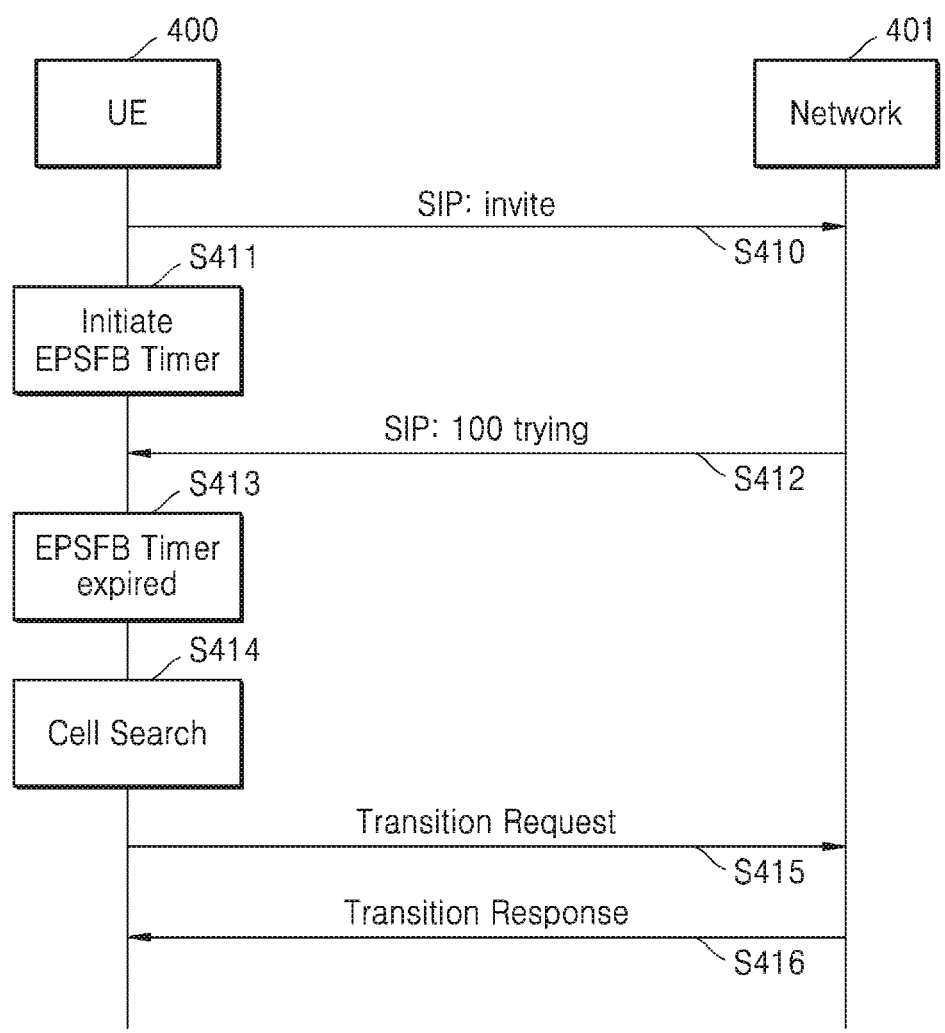
Figure 9A:
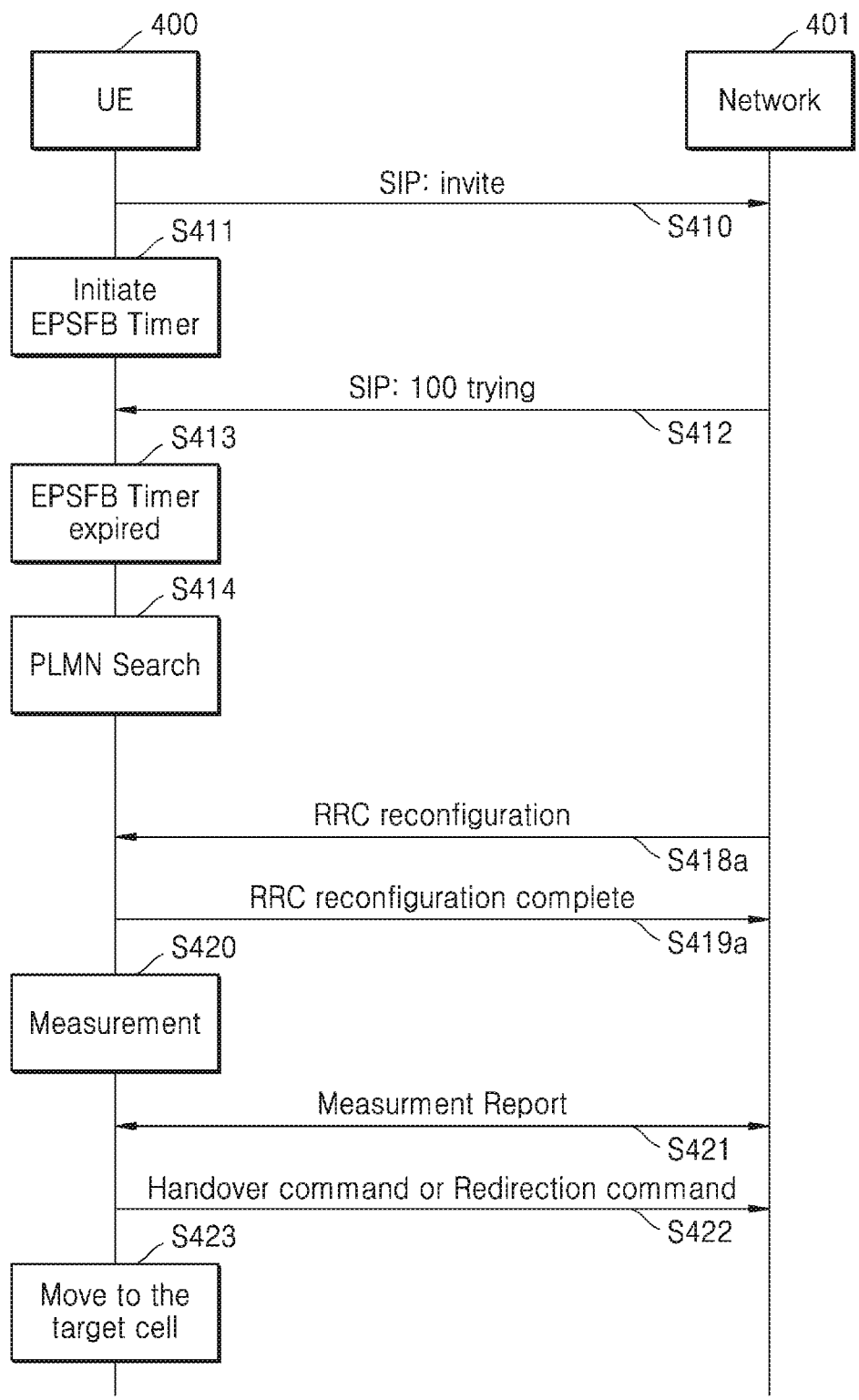
Figure 9B:
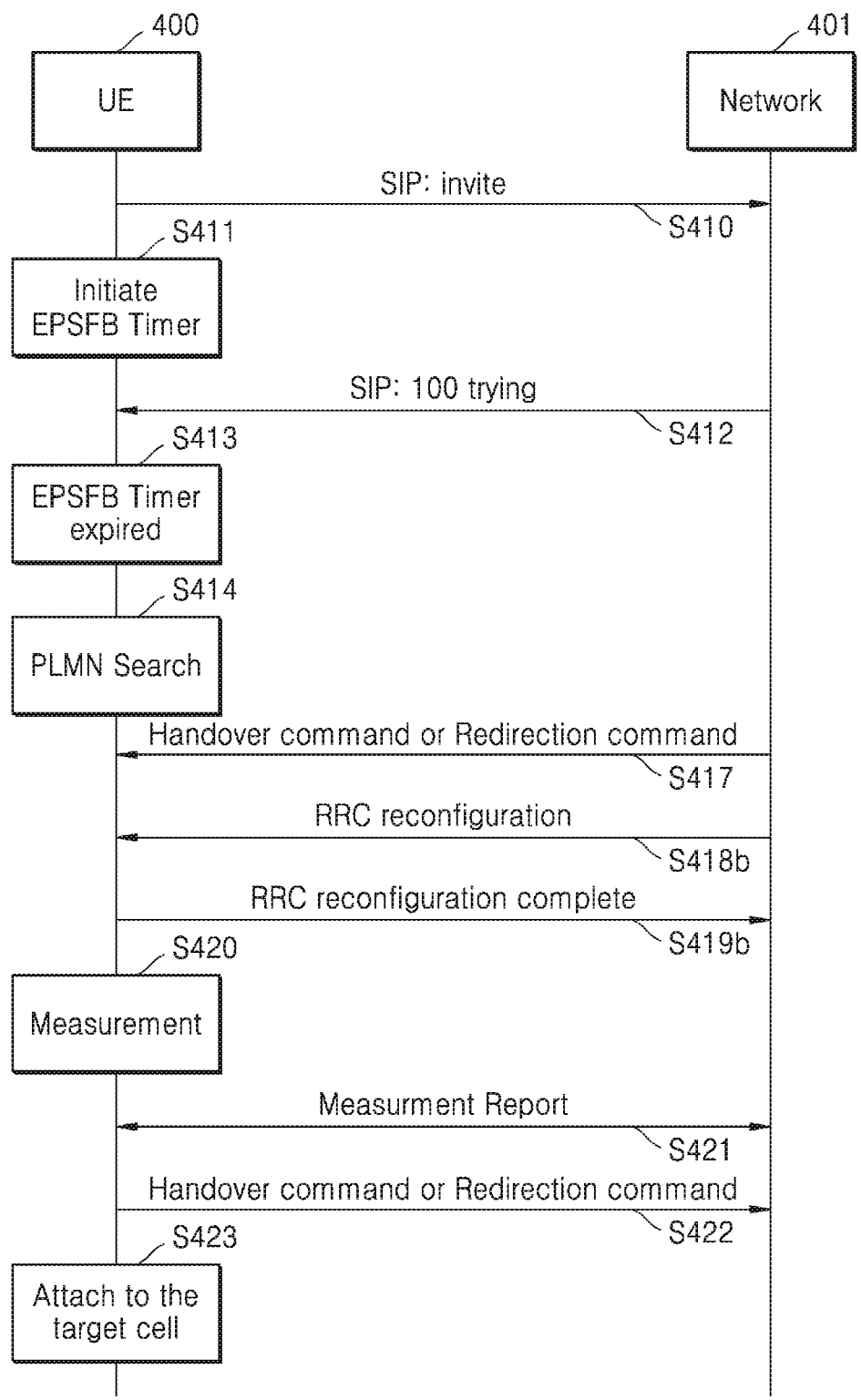
Figure 10:
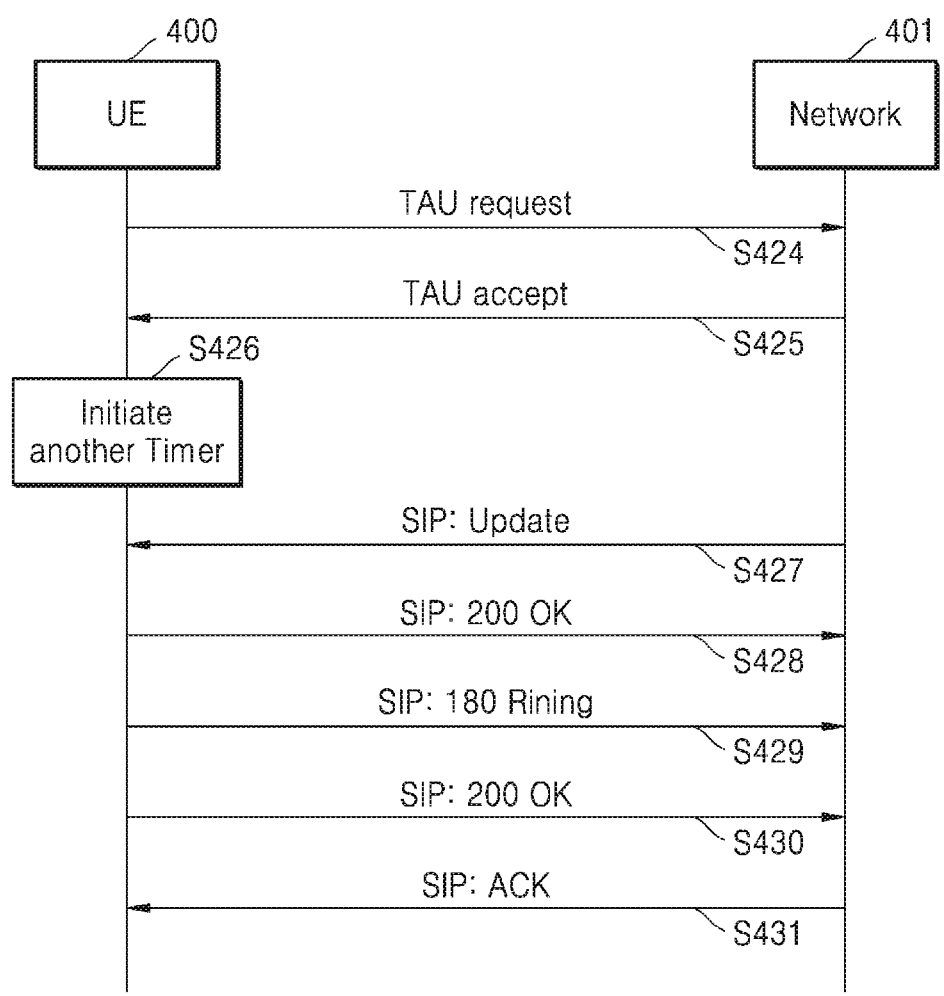
Figure 11:
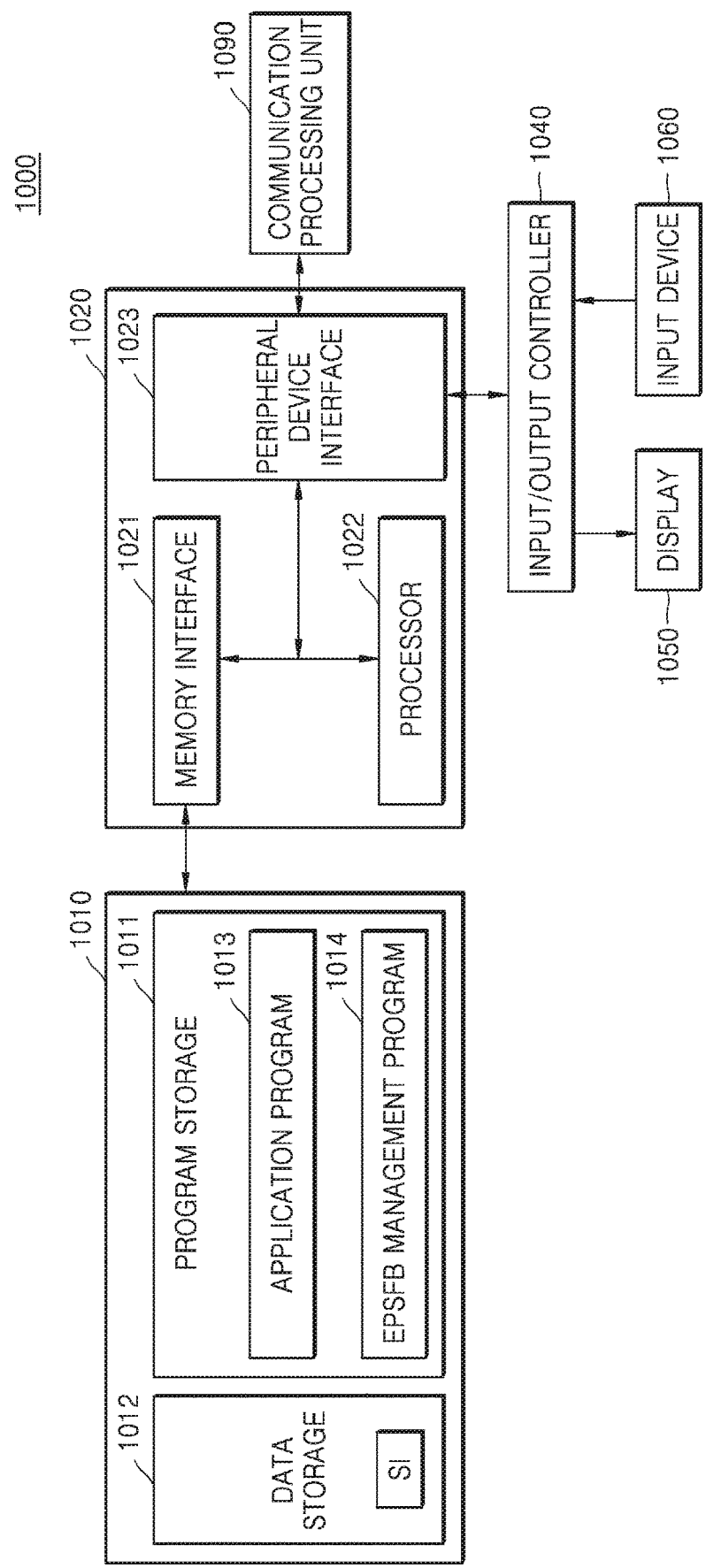
Figure 12:
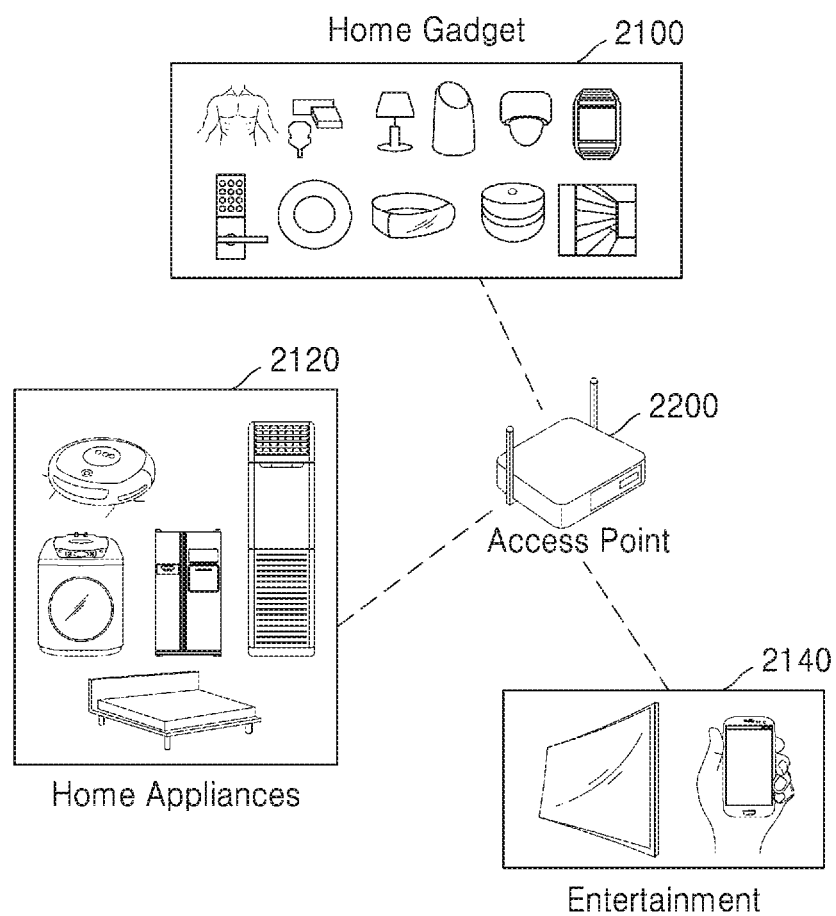

call session of a terminal, according to an example embodiment of the inventive concept;

FIGS. 8, 9A, and 9B are block diagrams illustrating a method of operating a terminal, according to an example embodiment of the inventive concept;

FIG. 10 is a block diagram illustrating a method of operating a terminal by using a session initiation protocol (SIP)-based timer, according to an example embodiment of the inventive concept;

FIG. 11 is a block diagram illustrating an electronic device according to an example embodiment of the inventive concept; and FIG. 12 is a diagram illustrating communication devices that perform an operation according to an example embodiment of the inventive concept.

DETAILED DESCRIPTION OF THE EMBODIMENTS

The present disclosure relates generally to a wireless communication method. More particularly, embodiments of the present disclosure relate to a terminal that performs Internet protocol multimedia subsystem (IMS)-based voice communication, a wireless communication system including the terminal, and a method of operating the terminal.

In some examples, some wireless communication networks (e.g., 5G systems) may not support full network coverage for certain services, such as voice communication services. Therefore, techniques such as evolved packet system fallback (EPSFB) procedures may be employed to provide smooth voice communication services in such networks (e.g., by being closely connected to 4G voice over LTE (VoLTE) deployments). For example, an EPSFB procedure may include a handover procedure, a redirection procedure, etc., where the terminal is attached from a first base station (e.g., a 5G base station) to a second base station (e.g., an LTE base station) for voice communication services.

For example, a terminal may receive certain messages or commands (e.g., EPSFB initiation messages) from a base station in a 5G radio access technology (RAT) system to perform a EPSFB procedure and support voice communications via a base station in a 4G or LTE RAT. In some examples, such EPSFB initiation messages may not be received by a terminal due to a network connection problem, a weak electric field, etc., and the terminal may not successfully initiate or perform the EPSFB procedure. Therefore, there is a need in the art for improved voice communication transition procedures (e.g., between a 5G system and an LTE system).

In some embodiments, the present disclosure performs a transitional operation using a timer (e.g., an EPSFB timer) when a terminal does not receive an EPSFB message or command to perform an EPSFB procedure.

The method of operating a terminal of the present disclosure includes connecting a first radio access technology (RAT)-based network to a first base station, transmitting a first message based on a session initiation protocol to the first base station, starting an ETSFB timer in response to the first message to the first base station, performing any one of an EPSFB procedure and a transition procedure to connect a second RAT-based network to a second base station by using the EPSFB timer, and performing a voice communication session through the second RAT-based network.

Hereinafter, embodiments of the inventive concept will be described in detail with reference to the accompanying drawings.

Figure 1:
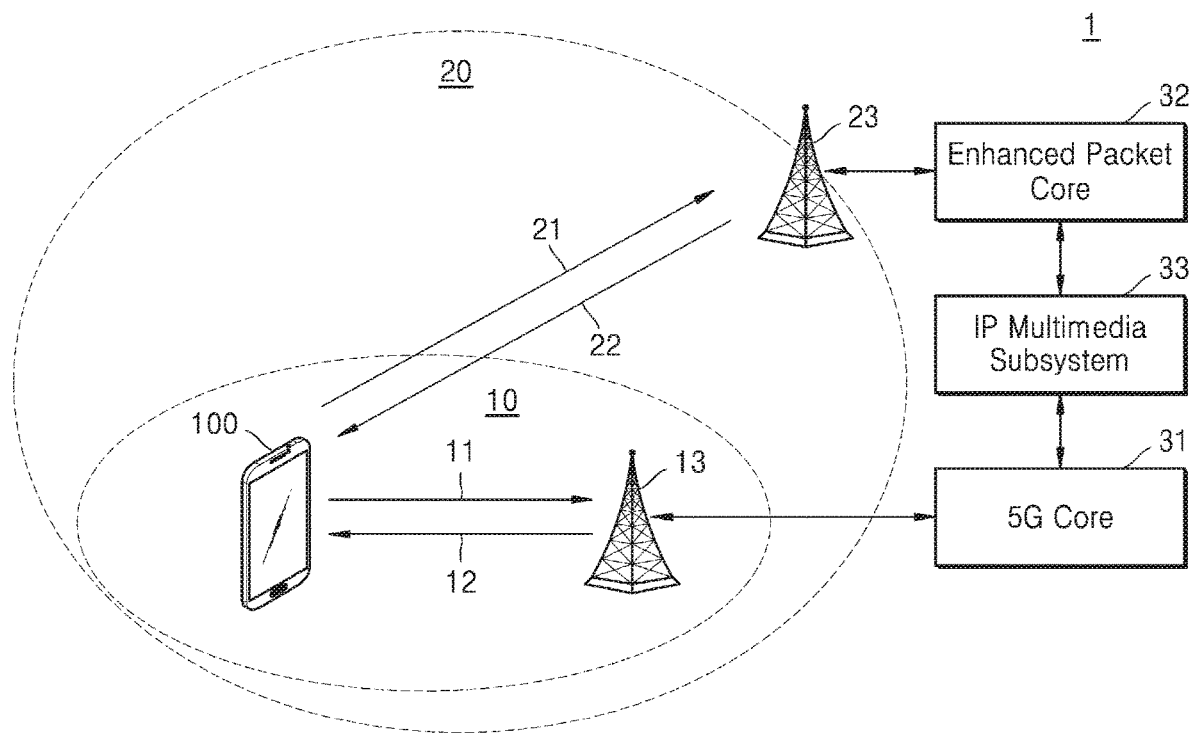
FIG. 1 is a diagram illustrating a wireless network according to an example embodiment of the inventive concept.

FIG. 1 is a diagram illustrating a wireless network 1 according to an example embodiment of the inventive concept. The wireless network 1 may include a plurality of communication systems and may be referred to as a wireless communication system.

Referring to FIG. 1, the wireless network 1 may include a first communication system 10 and a second communication system 20. The first communication system 10 and the second communication system 20 may be non-limiting examples and may include a new radio (NR) system, a fifth-generation (5G) system, a long-term evolution (LTE) system (or a fourth-generation (4G) system), a code division multiple access (CDMA) system, a global system for mobile communication (GSM) system, a wireless local area network (WLAN) system, or any other communication system. Hereinafter, description will be made on the assumption that the first communication system 10 is a 5G communication system and the second communication system 20 is an LTE communication system, but it will be understood that the technical idea of the inventive concept is not limited thereto. For example, the first communication system 10 and the second communication system 20 may support mutually heterogeneous radio access technology (RAT), and in this case, the technical idea of the inventive concept may be applied thereto.

The first communication system 10 may include a first base station 13 and a 5G core 31 to provide a 5G-based network service to a terminal 100. The second communication system 20 may include a second base station 23 and an enhanced packet core (EPC) 32 to provide an LTE-based network service to the terminal 100.

The terminal 100 may be mobile as a wireless communication device and may transmit and receive data. Additionally, or alternatively, terminal 100 may control information by communicating with the base stations 13 and 23 through a downlink (DL) channel and an uplink (UL) channel. The terminal 100 may be referred to as, for example, user equipment, a mobile station (MS), a mobile terminal (MT), a user terminal, a subscriber station (SS), a wireless device, a handheld device, or so on.

The first base station 13 and the second base station 23 may refer to fixed stations communicating with the terminal 100 and/or other base stations. The first base station 13 and the second base station 23 may refer to, for example, a cell, a node B, an evolved-node B (eNB), a sector, a site, a base transceiver system (BTS), an access point (AP), a relay node, a remote radio head (RRH), a radio unit (RU), and so on.

In an example embodiment, the terminal 100 may support dual connectivity. For example, the terminal 100 may perform 5G communication with the first base station 13 through an uplink channel 11 and a downlink channel 12. At the same time, the terminal 100 performs LTE communication with the second base station 23 through an uplink channel 21 and a downlink channel 22.

In an example embodiment, the first communication system 10 may locally support IMS registration, and when both the terminal 100 and the 5G-based network perform voice calls (or voice communication) through an EPS, the first communication system 10 may support the voice call through the EPS rather than a local system. Evolved packet system fallback (EPSFB) for a voice call may occur when triggering fallback to an EPS or steering a voice call to the EPS in a 5G-based network. The EPSFB may occur for both a mobile originated call and a mobile terminated call.

In an example embodiment, when the terminal 100 starts an Internet protocol (IP) multimedia subsystem (IMS) voice call to an IP multimedia subsystem (IMS) 33, a 5G-based network may perform an EPSFB procedure. For example, the terminal 100 may operate in a standalone mode for the 5G-based network and establish a 5G-based network connection to the first base station 13 to communicate with the first base station 13, and in a case of starting the IMS voice call, the terminal 100 may use the 5G-based network when performing the EPSFB procedure.

In an example embodiment, the terminal 100 may transmit, to the first base station 13, a first message based on a session initiation protocol (SIP) for the IMS voice call. The terminal 100 may count the time until receiving a certain message or command for an LTE-based network connection (or an EPSFB procedure) to the first base station 13 in response to transmission of the first message.

In another embodiment, when receiving the first message from the first base station 13, the terminal 100 may count the time until receiving a certain message or command for the LTE-based network connection (or the EPSFB procedure) in response to reception of the first message.

For example, the technical idea of the inventive concept may be applied to both a mobile originated call and a mobile terminated call.

In an example embodiment, when receiving the certain message or command from the first base station 13 within a preset time, the terminal 100 may perform the EPSFB procedure. When not receiving the certain message or command within the preset time, the terminal 100 may perform a transition procedure of actively searching for a base station (for example, the second base station 23) for the LTE-based network connection. Hereinafter, for the sake of convenient description, it is assumed that a preferred base station (e.g., an optimal base station) to which the terminal 100 is attached for an IMS voice call is the second base station 23. The EPSFB procedure may include any one of a handover procedure and a redirection procedure according to a method by which the terminal 100 is attached from the first base station 13 to the second base station 23.

In an example embodiment, the terminal 100 may perform a transition procedure including a base station search (or a cell search) for the LTE-based network connection without receiving a special message or command from the first base station 13. The transition procedure may be referred to as a forced transition procedure. The terminal 100 may transmit a base station search result to the first base station 13, and the first base station 13 may control handover or redirection to another base station (for example, the second base station) in response thereto.

The terminal 100 may be attached to the second base station 23 to perform a voice communication session on the LTE-based network and may be connected to the EPC 32 and the IMS 33 through the second base station 23 to be provided with an IMS voice call service.

The terminal 100, according to an example embodiment of the inventive concept, may actively perform a transition procedure to smoothly perform handover or redirection to another base station when not receiving a certain message or command used to perform an EPSFB procedure within a preset time due to a network problem or a weak electric field. Therefore, a stable IMS voice call service may be used.

Figure 2:
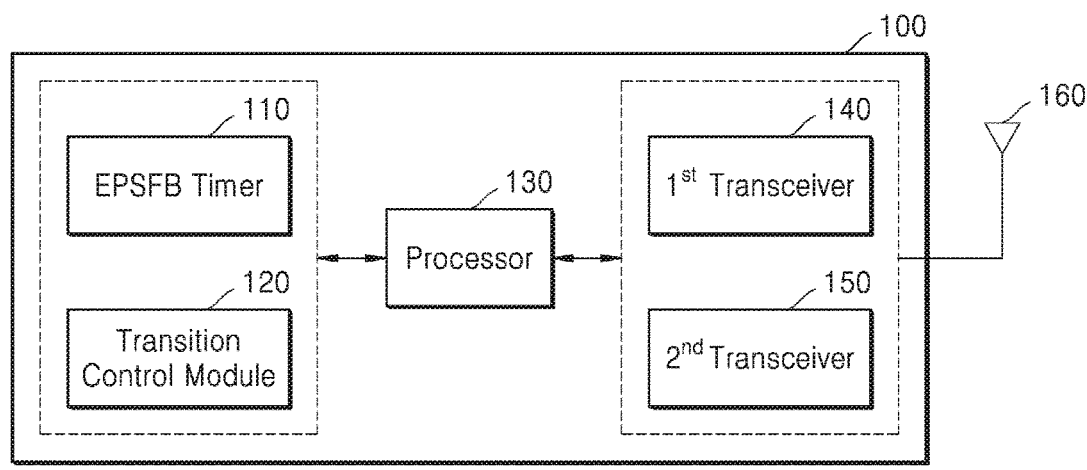
FIG. 2 is a block diagram illustrating a terminal according to an example embodiment of the inventive concept.

FIG. 2 is a block diagram illustrating the terminal 100 according to an example embodiment of the inventive concept.

Referring to FIG. 2, the terminal 100 may include an EPSFB timer 110, a transition control module 120, a processor 130, a first transceiver 140, a second transceiver 150, and an antenna 160. In addition, an implementation example of the terminal 100 illustrated in FIG. 2 is merely an example, and the inventive concept is not limited thereto, and the terminal 100 may include more or fewer components, and the antenna 160 may include a plurality of antennas.

The first transceiver 140 and the second transceiver 150 may perform band conversion, amplification, and so on of signals and transmit and receive signals by using the antenna 160. The first transceiver 140 and the second transceiver 150 may constitute a radio frequency (RF) integrated circuit, upconvert a baseband signal received from the processor 130 into an RF band signal, transmit the RF band signal through the antenna 160, and downconvert the RF band signal received through the antenna 160 into a baseband signal. For example, the first transceiver 140 and the second transceiver 150 may each include a transmission filter, a reception filter, an amplifier, a mixer, an oscillator, a digital to analog converter (DAC), an analog to digital converter (ADC), and so on.

The processor 130 may perform a conversion operation between a baseband signal and a bit stream according to a physical layer standard of a system. For example, the processor 130 may generate complex symbols by encoding and modulating a transmission bit stream during data transmission. In addition, the processor 130 may recover a received bit stream by demodulating and decoding the baseband signal provided from the first transceiver 140 and the second transceiver 150 when receiving data.

In an example embodiment, the terminal 100 may transmit and receive a signal to and from the first base station 13 (FIG. 1) by using the first transceiver 140 and may transmit and receive a signal to and from the base station 23 of FIG. 1 by using the second transceiver 150.

The processor 130 may control the entire operation of the terminal 100. In an example embodiment, the processor 130 may initiate a 5G voice call and detect an EPSFB triggered by the IMS 33. The processor 130 may count time by starting the EPSFB timer 110 from a point in time when the first message based on the SIP is transmitted to the first base station 13 (FIG. 1) or the first message is received from the first base station 13 (FIG. 1).

In an example embodiment, the EPSFB timer 110 may make the processor 130 determine whether or not to perform a future transition procedure. The EPSFB timer 110 may continue counting until a certain message or command for an LTE-based network connection is received. The EPSFB timer 110 may stop counting and may be reset when receiving a certain message or command, and the processor 130 may perform an EPSFB procedure in response to the certain message or command. When the EPSFB timer 110 expires, the processor 130 may perform an active transition procedure by using the transition control module 120. Details of the transition procedure will be described below with reference to FIGS. 3 and 4. In some embodiments, the EPSFB timer 110 and the transition control module 120 may be implemented as software logic and stored as code in a memory in the terminal 100. The code may be implemented by the processor 130. Furthermore, the EPSFB timer 110 and the transition control module 120 may be implemented with hardware logic or may be implemented in a form in which software logic and hardware logic are merged.

Figure 3:
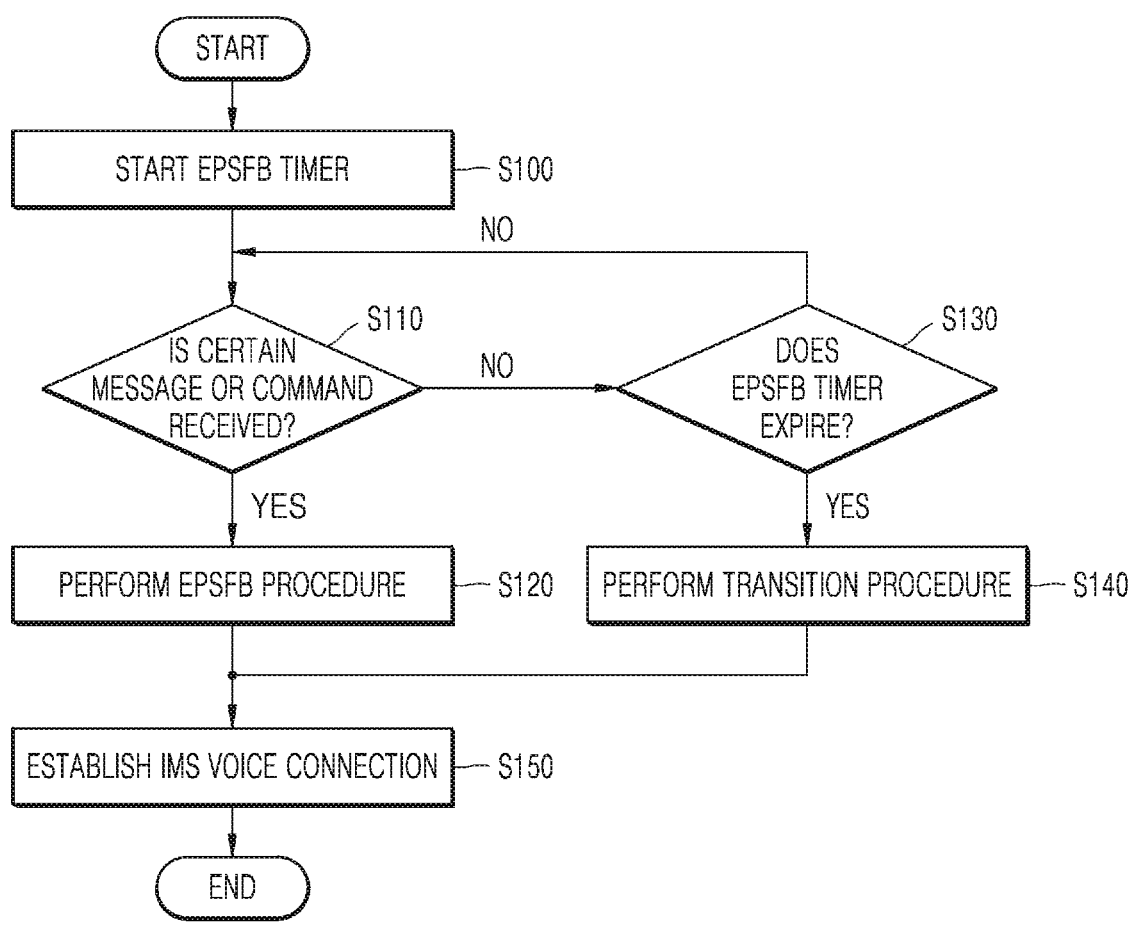
FIG. 3 is a flowchart illustrating a method of operating a terminal, according to an example embodiment of the inventive concept.

FIG. 3 is a diagram illustrating a method of operating a terminal, according to an example embodiment of the inventive concept.

According to the techniques described herein, a terminal may establish a connection with a first base station using a first RAT. The terminal may (e.g., upon initiating a voice communication session with the first base station) start an EPSFB timer (at S100). According to the various embodiments described herein, the terminal may perform the voice communication session through a second base station using a second RAT based at least in part on performing one of: an EPSFB procedure (at S120) when an EPSFB initiation message has been received prior to expiration of the EPSFB timer or a transition procedure (at S140) when the EPSFB timer expires prior to receiving the EPSFM initiation message.

Referring to FIG. 3, in step S100, a terminal may initiate an IMS voice call and may start the EPSFB timer when transmitting or receiving a first message based on a SIP from a first base station connected to a 5G-based network. In an example embodiment, the first message may be a SIP invitation message.

In step S110, the terminal may check the reception of a certain message or command used by the terminal to perform an EPSFB procedure from the first base station. In an example embodiment, the certain message may be a radio resource control (RRC)-related message or a redirection message, and the certain command may be a handover command. However, this is an example embodiment and the inventive concept is not limited thereto, and the technical idea of the inventive concept may be applied to various messages or various commands received by a terminal to perform the EPSFB procedure defined in a $3^{rd}$ generation partnership project (3GPP) standard specification.

When an answer of step S110 is "YES", the terminal may perform the EPSFB procedure in response to the certain message or command in the following step S120. For instance, performing the EPSFB procedure may include performing a redirection procedure by releasing a link with the first base station and re-establishing a link with the second base station. In other examples, performing the EPSFB procedure may include performing a handover procedure from a 5G core (5GC) to an enhanced packet core (EPC) through the second base station (e.g., while connected to the first base station). Details of the EPSFB procedure will be described below with reference to FIGS. 6A to 7.

Otherwise, when the answer of step S110 is "NO", step S130 may proceed. In step S130, the terminal may check whether or not the EPSFB timer expires. The EPSFB timer may expire when the certain message or command is not received for a preset period of time.

When an answer of step S130 is "YES", step S140 may proceed. In step S140, the terminal may actively perform a transition procedure. In an example embodiment, the terminal may perform a public land mobile network (PLMN) search as the transition procedure and transmit a search result including state information regarding a second base station with an optimal communication state to the first base station. For instance, in some embodiments, performing the transition procedure includes performing a PLMN search procedure and requesting a transition to the second base station based at least in part on the PLMN search procedure (e.g., as further described herein).

In step S150, the terminal may establish an IMS voice session. In an example embodiment, after step S120 or step S140, the terminal may be attached to the second base station through a 5G-based network to the first base station and may be connected to an IMS through the second base station to establish the IMS voice session. Thereafter, an IMS voice call service may be provided to the terminal.

Figure 4:
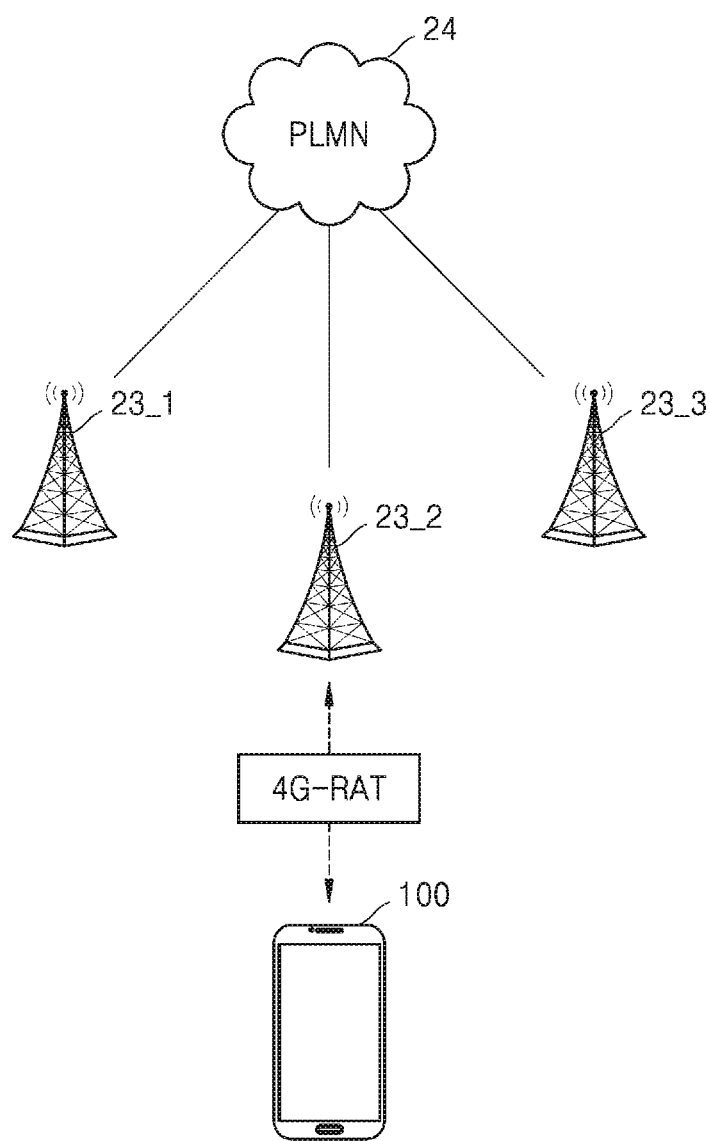
FIG. 4 is a diagram illustrating a public land mobile network (PLMN) search of a terminal, according to an example embodiment of the inventive concept.

FIG. 4 is a diagram illustrating a PLMN search of a terminal according to an example embodiment of the inventive concept.

Referring to FIG. 4, a PLMN 24 may provide a 4G communication service to the terminal 100 through a 4G RAT-based network (or an LTE-based network). In FIG. 4, in addition to the PLMN 24 supporting the 4G RAT-based network, a PLMN (not illustrated) supporting a 5G RAT-based network (or 5G-based network) may be further included in the terminal 100 to provide the terminal 100 with a 5G communication service. In some embodiments, the PLMN 24 may also support the 5G RAT-based network.

The PLMN 24 may communicate with the terminal 100 through a second base station 23_1 to a fourth base station 23_3. Each of the second base station 23_1 to the fourth base station 23_3 may provide a communication service to a geographic region that may be divided into one or more cells.

The second base station 23_1 to the fourth base station 23_3 may periodically transmit a system information message to the terminal 100 such that the terminal 100 entering each service region may search for the base station. In an example embodiment, the system information message may include a PLMN ID, a base station ID (or a cell ID), RAT information, frequency information, and so on.

In an example embodiment, the terminal 100 may perform a PLMN search based on the system information message as the transition procedure described above. The terminal 100 may receive a system information message from a corresponding base station by searching for base stations of some or all supportable RFs and may extract an available PLMN from the received system information message. When at least one available PLMN is extracted, the terminal 100 may select one PLMN according to priority. For example, the terminal 100 may select the PLMN 24 of FIG. 4 according to a priority based on a most recently registered PLNM, a subscribed PLMN, and a PLMN with the best signal quality, among the PLMNs that may support the 4G-RAT network.

The terminal 100 may search for an optimal base station with the best signal quality among the second base station 23_1 to the fourth base station 23_3 of the selected PLMNs 24. For example, when the optimal base station is the second base station 23_1, the terminal 100 may transmit the PLMN search result including state information on the second base station 23_1 to the first base station 13 (FIG. 1) of the 5G-based network, which is being camped-on.

For example, in some cases, one or more embodiments described herein may include channel estimation performed by a terminal. In some cases, a terminal may perform channel estimation by generating channel state information (CSI), which refers to information describing the channel properties of a communication link. For example, the CSI may be determined by analyzing a reference signal of the transmitter. In some cases, CSI may describe how a signal propagates from the transmitter to the receiver and may represent the combined effects of, for example, scattering, fading, and power decay.

The first base station 13 (FIG. 1) may perform signaling with the terminal 100 and the second base station 23_1 such that the terminal 100 is attached to the second base station 23_1 based on the PLMN search result.

Figure 5:
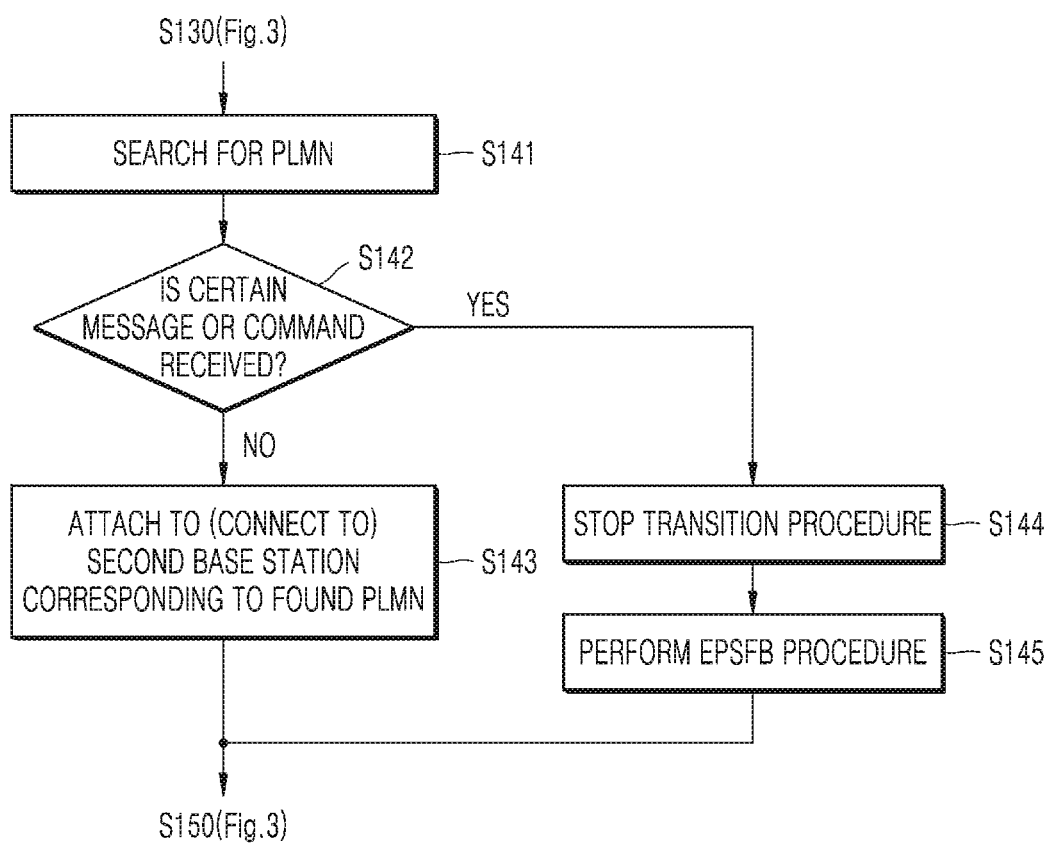
FIG. 5 is a flowchart illustrating a transition procedure of a terminal, according to an example embodiment of the inventive concept.

FIG. 5 is a flowchart illustrating a transition procedure of a terminal according to an example embodiment of the inventive concept.

Referring to FIG. 5, subsequently to step S130 (FIG. 3), the terminal may search for a PLMN. In an example embodiment, the terminal may search for a PLMN that is available among a plurality of PLMNs and supports an LTE-based network for connection with the IMS, based on a received system information message. The terminal may search for an optimal second base station with the best signal quality among the found base stations of the PLMN.

In step S142, the terminal may continuously check whether or not a certain message or command used to perform the EPSFB procedure is received from the first base station until step S130 is completed.

When an answer of step S142 is "NO", in the following step S143, the terminal may be attached to the second base station corresponding to the found PLMN. In an example embodiment, the terminal may transmit a PLMN search result including status information on the second base station found in step S130 to the first base station, and the first base station may control a connection to the base station based on the PLMN search result.

Otherwise, when the answer of step S142 is "YES", in the following step S144, the terminal may stop the transition procedure. In an example embodiment, the terminal may immediately stop the transition procedure when receiving a certain message or command used to perform the EPSFB procedure during the transition procedure. In some embodiments, the terminal may also continue the transition procedure when the transition procedure progresses more than a threshold.

In step S145, the terminal may perform the EPSFB procedure in response to a certain message or command.

Figure 6A:
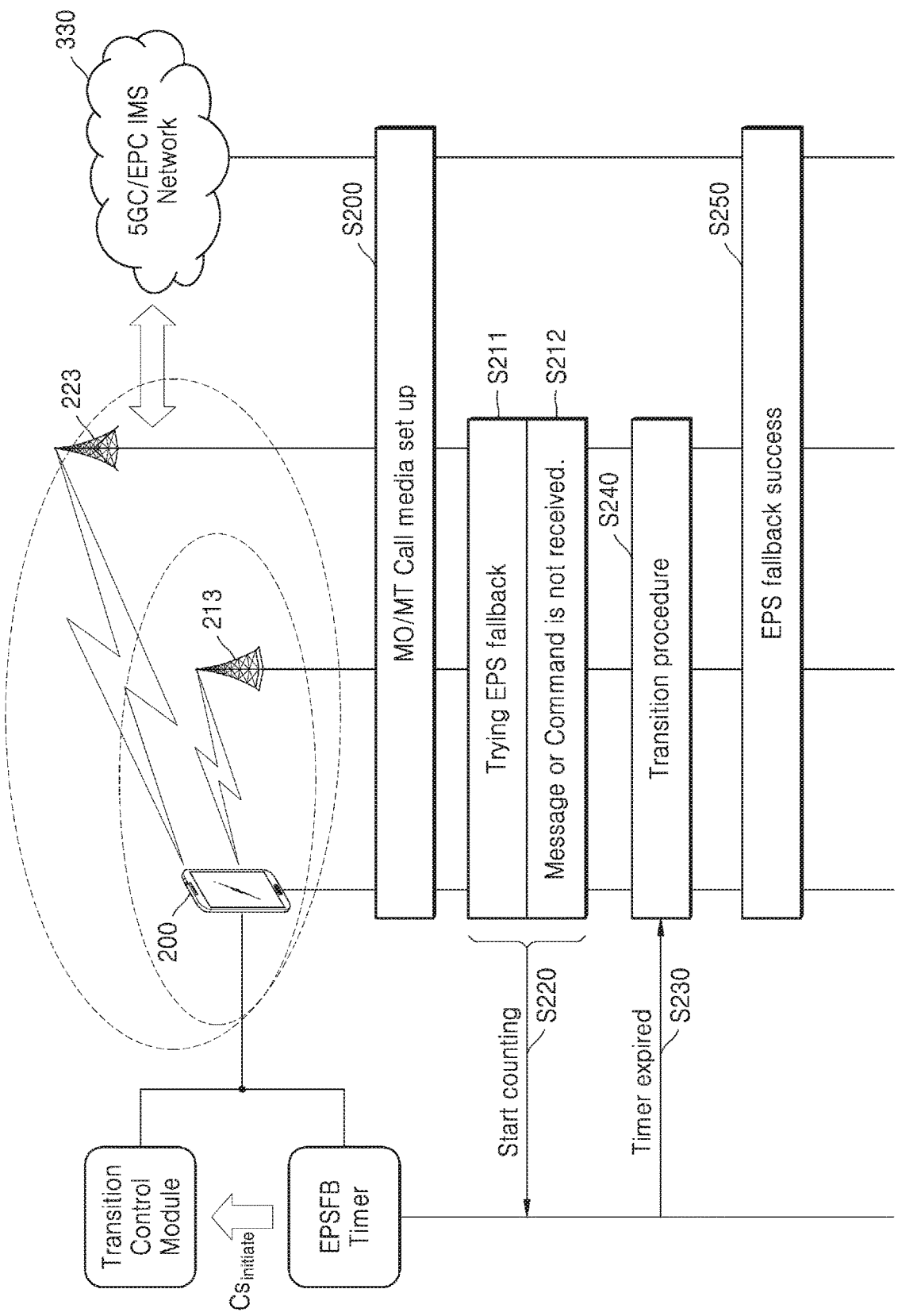
FIGS. 6A and 6B are diagrams illustrating a method of operating a terminal that performs a transition procedure, according to an example embodiment of the inventive concept.
Figure 6B:
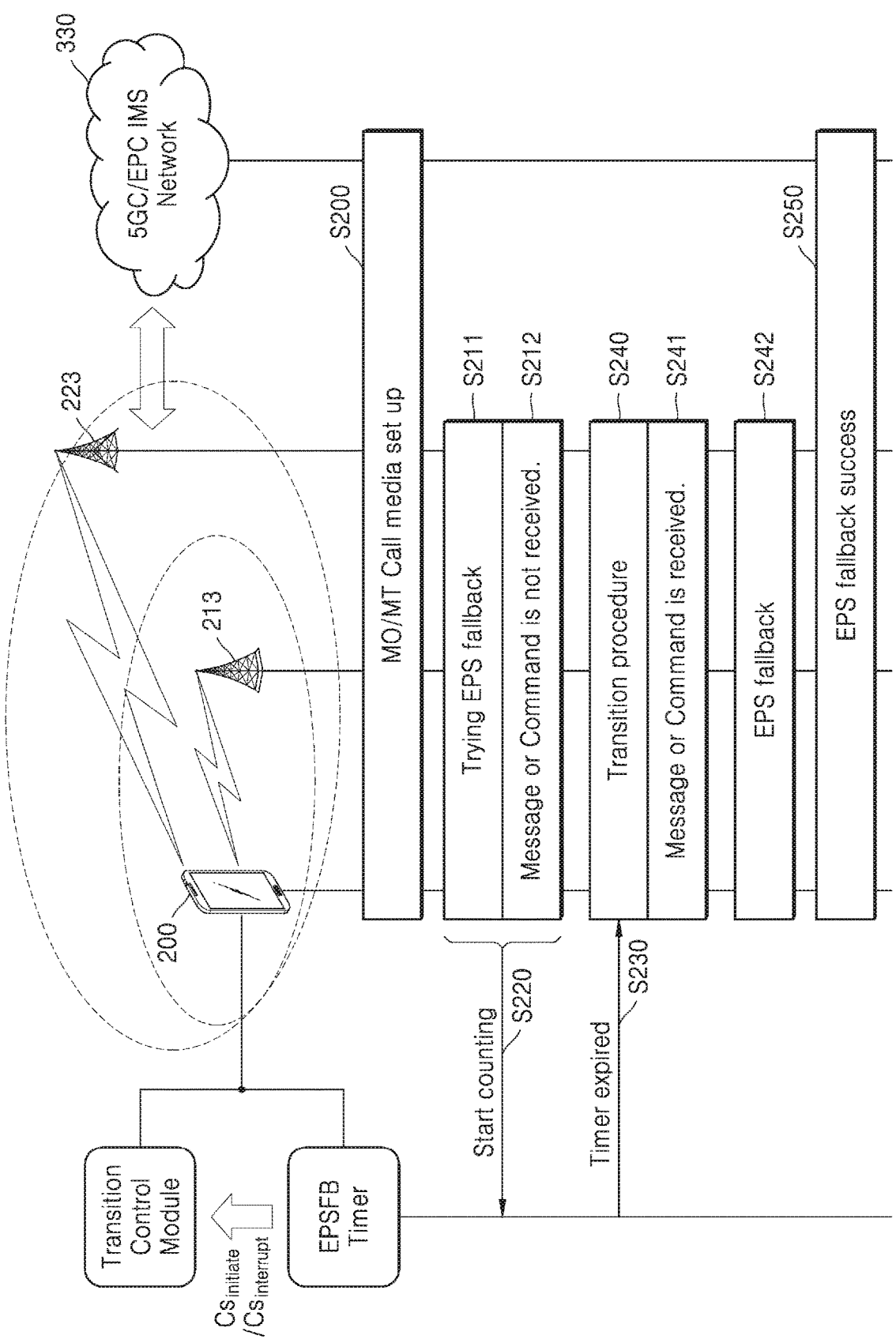

FIGS. 6A and 6B are diagrams illustrating a method of operating a terminal 200 that performs a transition procedure, according to an example embodiment of the inventive concept.

Referring to FIG. 6A, the terminal 200 may include an EPSFB timer and a transition control module and may be connected to a first base station 213 in a 5G-based network. A second base station 223 may support an LTE-based network. The 5G-based network may include a plurality of network entities with a 5G core (5GC), an EPC, and an IMS. Hereinafter, the plurality of network entities may be referred to as a 5GC/EPC IMS network 330.

In step S200, the terminal 200 may start a mobile originated (MO) call or a mobile terminated call and perform a media setup.

In step S211, the 5G-based network may attempt an EPSFB procedure. In an example embodiment, the EPSFB procedure may be performed by a redirection procedure. For example, in the redirection procedure, the terminal may release a link with the first base station 213 and re-establish a link with the second base station 223. In an example embodiment, the EPSFB procedure may be performed by a handover procedure. For example, in the handover procedure, the terminal 200 may be connected to the second base station 223 to perform handover from a 5GC to an EPC while connected to the first base station 213.

When performing step S211, the terminal 200 may count time by using an EPSFB timer as in step S220 at a certain point in time. As in step S212, counting of the EPSFB timer may be continued when the terminal 200 does not receive a certain message or command for an EPSFB procedure.

When the EPSFB timer expires in step S230, the terminal 200 may perform an active transition procedure in the following step S240. In an example embodiment, the EPSFB timer may provide a control signal CS initiate for controlling the start of the transition procedure to a transition control module as a timer expires.

In step S250, the terminal 200 may perform an IMS voice call by successfully performing the EPSFB procedure through the transition procedure.

Referring further to FIG. 6B, in step S240, when the terminal 200 receives a certain message or command as in step S241 during the transition procedure, the EPSFB timer may provide a second control signal $CS_{interrupt}$ for controlling interruption of the transition procedure to the transition control module.

In step S242, the terminal 200 may stop the transition procedure of step S240 in response to a certain message or command and perform the EPSFB procedure based on the certain message or command. Descriptions of the steps not described with reference to FIG. 6B have already been given with reference to FIG. 6A, and thus, the steps are omitted herein.

Figure 7:
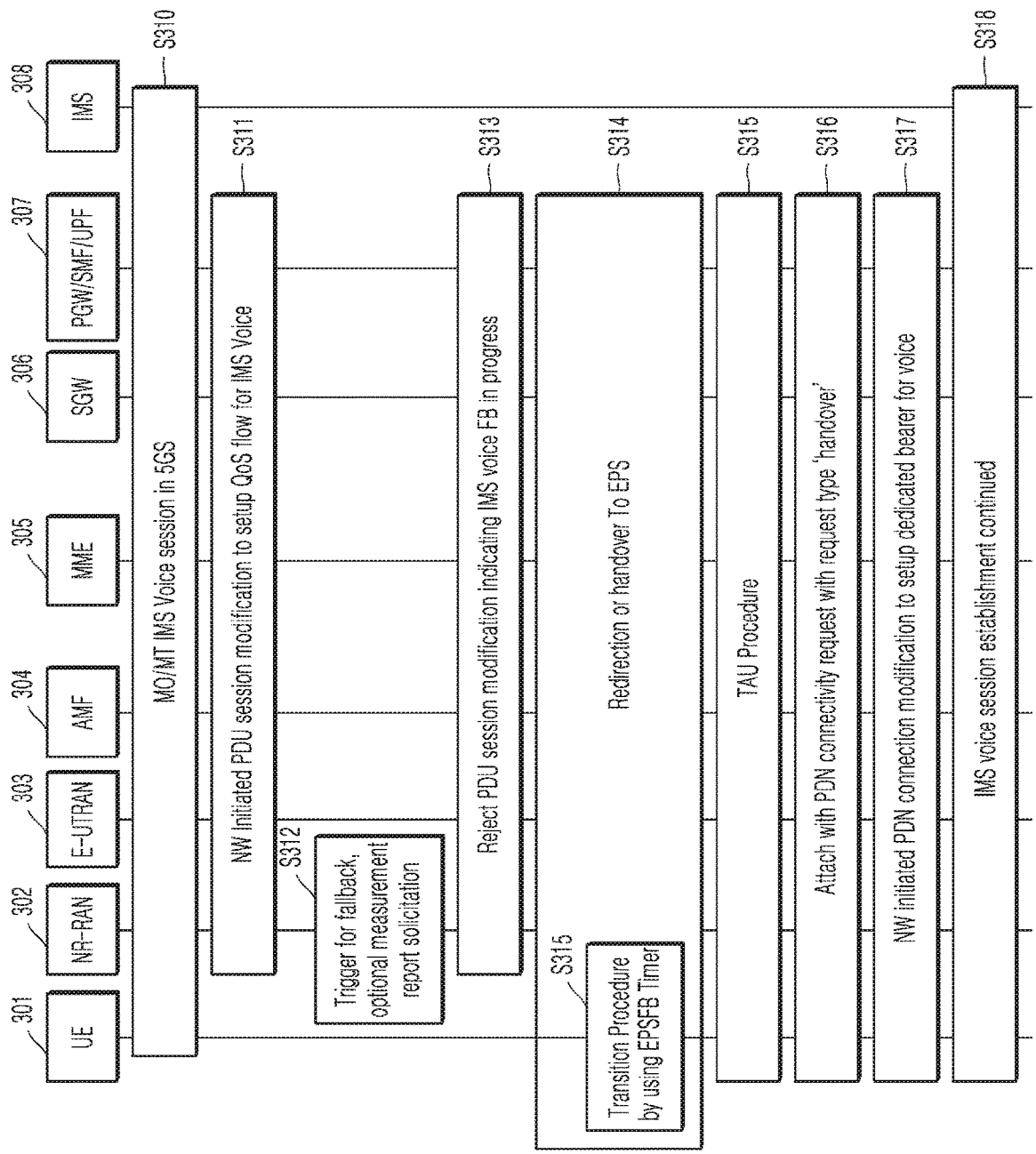
FIG. 7 is a block diagram illustrating a method of establishing an Internet protocol multimedia subsystem (IMS)

FIG. 7 is a block diagram illustrating a method of establishing an IMS call session of a terminal, according to an example embodiment of the inventive concept.

Referring to FIG. 7, a terminal 301 may be connected to a 5G-based network and an LTE-based network in a wireless network. The wireless network may include a next generation radio access network (NG-RAN) 302, an evolved universal radio access network (E-UTRAN) 303, an access mobility management function (AMF) 304, a mobility management entity (MME) 305, a serving gateway (SGW) 306, a packet data network gateway (PGW)/session management function (SMF)/user plane function (UPF) 307, and an IMS 308. For example, an EPC may be a concept including the MME 305, the SGW 306, and a PGW, and an EPS may be a concept including the EPC and the E-UTRAN 303.

In step S310, the terminal 301 may start an IMS voice session of MO or MT on a 5G-based network.

In step S311, the wireless network may initiate packet date unit (PDU) session modification to set up a Quality of Service (QoS) flow for IMS voice communication.

In step S312, the 5G-based network may access the NG-RAN 302 to trigger an EPSFB procedure. In addition, the NG-RAN 302 may trigger a measurement report solicitation.

In step S313, the PGW/SMF/UPF 307, with 5G-based network entities, may reject the PDU session modification indicating that IMS voice fallback (FB) is in progress and provide information on the rejection to the NG-RAN 302.

In step S314, the PGW/SMF/UPF 307 may perform redirection or handover to the EPSFB procedure and transmit a certain message or command regarding the EPSFB procedure to the terminal 301.

In an example embodiment, while performing step S314, the terminal 301 may perform an active transition procedure by using an EPSFB timer. The terminal 301 may check whether or not a certain message or command regarding the EPSFB procedure is received within a preset time by using the EPSFB timer and may perform the transition procedure when the EPSFB timer expires. The terminal 301 may solve a problem, through the transition procedure, that the EPSFB procedure may not be performed due to poor network conditions or failure to receive a certain message or command in a weak electric field.

After completing the EPSFB procedure of step S314, the wireless network may perform a tracking area update procedure in step S315.

In step S316, the wireless network may be attached according to a packet data network (PDN) connection request corresponding to a request type of "handover".

In step S317, the wireless network initiates a PDN connection modification to establish a dedicated bearer for a voice call. In step S318, the IMS voice session is continuously established to enable the terminal 301 to be provided with an IMS voice call service.

FIGS. 8, 9A, and 9B are block diagrams illustrating a method of operating a terminal 400, according to an example embodiment of the inventive concept. Hereinafter, a network 401 may include the first base station 13 of the first communication system 10 of FIG. 1, the second base station 23 of the second communication system 20, the 5G core 31, the EPC 32, and the IMS 33, and may provide a heterogeneous RAT-based communication service to the terminal 400.

Referring to FIG. 8, in step S410, the terminal 400 may transmit an invitation message based on a SIP to the network 401.

The terminal 400 may start an EPSFB timer in response to transmission of the invitation message in step S411. In an example embodiment, the EPSFB timer may count the time until any one of an RRC-related message, a redirection message, and a handover command from the network 401 is received.

In step S412, the terminal 400 may receive a 100 trying message based on the SIP from the network 401.

In step S413, the EPSFB timer may expire after a preset time elapses, and the terminal 400 may perform a transition procedure in response to the expiration.

In step S414, the terminal 400 may perform a PLMN search as the transition procedure.

In step S415, the terminal 400 may request the network 401 to perform transition (or attachment) to an optimal base station detected as a result of the PLMN search.

In step S416, the terminal 400 may receive a transition response from the network 401 and may be attached to the optimal base station based on the transition response.

Referring further to FIG. 9A, in step S418*a*, the terminal 400 may stop the transition procedure with the PLMN search of step S414 when receiving an RRC reconfiguration message during the PLMN search of step S414.

In step S419, the terminal 400 may transmit an RRC reconfiguration completion message to the network 401 after performing RRC reconfiguration based on the RRC reconfiguration message.

In step S420, the terminal 400 may measure states of channels or networks to base stations that support an LTE-based RAT network to be connected to the IMS. In an example embodiment, the terminal 400 may measure signal quality of each of reference signals received from the base stations.

In step S421, the terminal 400 may transmit the measurement result with state information on an optimal base station to the network 401.

In step S422, the terminal 400 may receive a handover command or a redirection message to be handed over or redirected to the optimal base station.

In step S423, the terminal 400 may be connected to the optimal base station as a target cell.

Referring further to FIG. 9B, when receiving a handover command or a redirection message from the network 401 in step S417 during the PLMN search in step S414, the terminal 400 stops the transition procedure with the PLMN search in step S414.

In step S418*b*, the terminal 400 may receive an RRC reconfiguration message from the network 401. The RRC reconfiguration message may include information on a base station to which the terminal 400 is to be attached in the future.

In step S419*b*, the terminal 400 may transmit an RRC reconfiguration completion message to the network 401 after performing RRC reconfiguration based on the RRC reconfiguration message.

In step S423, the terminal 400 may be connected to a target cell based on the information included in the RRC reconfiguration message.

FIG. 10 is a block diagram illustrating a method of operating the terminal 400 using a SIP-based timer, according to an example embodiment of the inventive concept.

Referring to FIG. 10, in step S424, the terminal 400 may transmit a tracking area update request to the network 401.

In step S425, the terminal 400 may receive a tracking area update permission message from the network 401.

In step S426, the terminal 400 may start another timer in response to the tracking area update permission message. Another timer may include a SIP-based timer, and the terminal 400 may transmit a SIP-based ACK to the network 401 to count the time until call setup is successful.

In step S427, the terminal 400 may receive a SIP-based update message and transmit a SIP-based 200 OK message to the network 401 in response thereto in step S428. In step S429, the terminal 400 may transmit a SIP-based 180 ringing message to the network 401 and transmit a SIP-based 200 OK message to the network 401 in step S430. Thereafter, in step S431, the terminal 400 may receive the SIP-based ACK from the network 401.

The terminal 400 may be provided with a smooth voice communication service by using the EPSFB timer according to the example embodiment of the inventive concept during an operation up to handover or redirection of a base station for an IMS voice call, and then using another timer during an operation until the call setup is successful.

FIG. 11 is a block diagram illustrating an electronic device 1000 according to an example embodiment of the inventive concept.

Referring to FIG. 11, the electronic device 1000 may include a memory 1010, a processor unit 1020, an input/output controller 1040, a display 1050, an input device 1060, and a communication processing unit 1090. Here, the memory 1010 may include a plurality of memories. Respective components will be described below.

The memory 1010 may include a program storage 1011 that stores a program for controlling an operation of the electronic device and a data storage 1012 that stores data generated during program execution. The data storage 1012 may store data used for an operation of an application program 1013 and an EPSFB management program 1014. In an example embodiment, the data storage 1012 may store system message information (SI) for a transition procedure according to example embodiments of the inventive concept. In addition, the SI may be updated periodically or non-periodically.

The program storage 1011 may store the application program 1013 and the EPSFB management program 1014. Here, a program included in the program storage 1011 may also be expressed as an instruction set, which may be a set of instructions. The application program 1013 may include program code for executing various applications operating in the electronic device 1000. For example, the application program 1013 may include code (or commands) on various applications driven by a processor 1022. The EPSFB management program 1014 may include control code for performing a transition procedure according to example embodiments of the inventive concept.

In an example embodiment, the processor 1022 may execute the EPSFB management program 1014, thereby performing an active transition procedure by using an EPSFB timer.

In addition, the electronic device 1000 may include a communication processing unit 1090 that performs communication functions for voice communication and data communication.

A peripheral device interface 1023 may control connections between the input/output controller 1040, the communication processing unit 1090, the processor 1022, and a memory interface 1021. The processor 1022 controls a plurality of base stations to provide a corresponding service by using at least one software program. In this case, the processor 1022 may execute at least one program stored in the memory 1010 to provide a service corresponding to the program.

A processor 1022 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 1022 is configured to operate a memory array using a memory controller. In other cases, a memory controller is integrated into the processor 1022. In some cases, the processor 1022 is configured to execute computer-readable instructions stored in a memory to perform various functions. In some embodiments, a processor 1022 includes special purpose components for modem processing, baseband processing, digital signal processing, or transmission processing.

The input/output controller 1040 may provide an interface between the display 1050, the input device 1060, and the peripheral device interface 1023. The display 1050 displays state information, input characters, moving pictures, and still pictures. For example, the display 1050 may display application program information driven by the processor 1022.

The input device 1060 may provide input data generated by selecting the electronic device to the processor unit 1020 through the input/output controller 1040. In this case, the input device 1060 may include a keypad including at least one hardware button, a touchpad for sensing touch information, and so on. For example, the input device 1060 may provide touch information such as a touch sensed through a touchpad, a touch movement, and a touch release, to the processor 1022 through the input/output controller 1040.

FIG. 12 is a diagram illustrating communication devices that perform operations according to an example embodiment of the inventive concept.

Referring to FIG. 12, a home gadget 2100, home appliances 2120, an entertainment device 2140, and an AP 2200 each perform a transition procedure for an IMS voice call according to embodiments of the inventive concept. In some embodiments, the home gadget 2100, the home appliances 2120, the entertainment device 2140, and the AP 2200 may constitute an Internet of Things (IoT) network system. It will be understood that the communication devices illustrated in FIG. 12 are only examples, and the terminal, according to the example embodiment of the inventive concept, may be included in other communication devices not illustrated in FIG. 12.

While the inventive concept has been particularly shown and described with reference to embodiments thereof, it will be understood that various changes in form and details may be made therein without departing from the spirit and scope of the following claims.

What is claimed is:

1. A method of operating a terminal, the method comprising:
   establishing a first radio access technology (RAT)-based network connection to a first base station;
   transmitting a first message to the first base station based on a session initiation protocol;
   starting an evolved packet system fallback (EPSFB) timer in response to the first message to the first base station;
   determining whether to perform an EPSFB procedure or a transition procedure based on whether a message is received prior to an expiration of the EPSFB timer;
   performing the EPSFB procedure or the transition procedure to connect a second RAT-based network to a second base station based on the determination; and
   performing a voice communication session through the second RAT-based network based at least in part on the EPSFB procedure or the transition procedure,
   wherein the transition procedure comprises:
   identifying the second RAT-based network using a system information message;
   performing a public land mobile network (PLMN) search for the identified second RAT; and
   transmitting, to the first base station, a search result including state information on the second base station.

2. The method of claim 1, wherein performing the transition procedure comprises:
   actively searching for the second base station.

3. The method of claim 2, wherein performing the EPSFB procedure comprises:
   searching for the second base station in response to receiving, from the first base station, at least one of a radio resource control (RRC)-related message, a redirection message, and a handover command.

4. The method of claim 1, wherein:
   the first message includes an invitation message of the session initiation protocol.

5. The method of claim 1, wherein:
   the EPSFB procedure is performed when at least one of a radio resource control (RRC)-related message, a redirection message, and a handover command is received from the first base station before the EPSFB timer expires; and
   the transition procedure is performed when the EPSFB timer expires.

6. The method of claim 5, wherein:
   the transition procedure is stopped and the EPSFB procedure is performed when the at least one of the radio resource control-related message, the redirection message, and the handover command is received from the first base station during the transition procedure.

7. The method of claim 1, wherein:
   the terminal operates in a standalone mode for the first RAT-based network.

8. The method of claim 1, wherein:
   the EPSFB procedure includes at least one of a handover procedure and a redirection procedure.

9. The method of claim 1, wherein
   the voice communication session is based on an Internet protocol multimedia subsystem (IMS).

10. The method of claim 1, wherein the transition procedure comprises:
    receiving a redirection message or a handover command in response to the search result from the first base station; and
    camping on the second base station based on receiving the redirection message or the handover command.

11. The method of claim 1, wherein:
the first RAT-based network includes a fifth-generation communication technology; and
the second RAT-based network includes a long term evolution (LTE) communication technology.

12. A terminal comprising:
a plurality of antennas;
a radio frequency (RF) integrated circuit for a first radio access technology (RAT)-based network and a second RAT-based network; and
a processor connected to the RF integrated circuit and configured to perform at least one of voice communication and data communication,
wherein the processor is further configured to:
camp on a first base station of the first RAT-based network and perform an Internet protocol multimedia subsystem (IMS) session initiation protocol (SIP) procedure provided by the first RAT-based network to perform the voice communication based on an IMS,
determine whether to perform an evolved packet system fallback (EPSFB) procedure or a transition procedure based on whether a message is received prior to an expiration of the EPSFB timer, and
perform the EPSFB procedure or the transition procedure to connect the second RAT-based network to a second base station based on the determination during the IMS SIP procedure,
wherein the processor is configured to perform the transition procedure by being configured to perform an active public land mobile network (PLMN) search operation when the EPSFB timer expires and transmit a search result to the first base station, and
wherein the processor is configured to stop the transition procedure and perform the EPSFB procedure when at least one of a radio resource control (RRC)-related message, a redirection message, and a handover command is received from the first base station during the transition procedure.

13. The terminal of claim 12, wherein the processor is configured to perform the EPSFB procedure when at least one of the radio resource control-related message, the redirection message, and the handover command is received from the first base station before the EPSFB timer expires.

14. The terminal of claim 12, wherein the processor is configured to perform a tracking area update (TAU) procedure for the second base station to perform the voice communication based on the Internet protocol multimedia subsystem through the second RAT-based network after performing the EPSFB procedure or the transition procedure.

15. The terminal of claim 12, wherein the processor is configured to start the EPSFB timer in response to an invitation message of a session initiation protocol to the first base station or an invitation message from the first base station during the Internet protocol multimedia subsystem session initiation protocol procedure.

16. The terminal of claim 12, wherein:
the first RAT-based network includes a fifth-generation communication technology; and
the second RAT-based network includes a long term evolution communication technology.

17. A wireless communication system comprising:
a first base station configured to support a first radio access technology (RAT)-based network;
a second base station configured to support a second RAT-based network; and
a terminal configured to:
camp on the first base station to perform an Internet protocol multimedia subsystem (IMS) session initiation protocol (SIP) procedure provided by a first RAT-based network to perform voice communication based on an IMS;
determine whether to perform an evolved packet system fallback (EPSFB) procedure or a transition procedure based on whether a message is received prior to an expiration of the EPSFB timer, and
perform the EPSFB procedure or the transition procedure to connect the second RAT-based network to the second base station based on the determination during the IMS SIP procedure,
wherein:
the transition procedure comprises an active public land mobile network (PLMN) search operation when the EPSFB timer expires during the IMS SIP procedure.

* * * * *